United States Patent [19]

Herter

[11] 3,748,395

[45] *July 24, 1973

[54] D.C. MONITOR CIRCUIT

[75] Inventor: Eberhard Herter, Stuttgart, Germany

[73] Assignee: International Standard Electric Corporation, New York, N.Y.

[ * ] Notice: The portion of the term of this patent subsequent to Aug. 25, 1987, has been disclaimed.

[22] Filed: June 2, 1970

[21] Appl. No.: 42,763

Related U.S. Application Data

[63] Continuation of Ser. No. 555,913, June 7, 1966, Pat. No. 3,525,816.

[30] Foreign Application Priority Data

June 7, 1966 Germany .......................... ST 24001

[52] U.S. Cl. .............................................. 179/18 FA

[51] Int. Cl. .............................................. H04m 3/22

[58] Field of Search ...................... 179/18 F, 18 FA, 179/175.3 R

[56] References Cited

UNITED STATES PATENTS 3,622,709 11/1971 Tjaden .............................. 179/18 F

*Primary Examiner*—Thomas W. Brown

*Attorney*—James B. Raden, C. Cornell Remsen, Walter J. Baum, Paul W. Hemminger, Charles L. Johnson, Jr., Delbert P. Warner and Marvin M. Chaban

[57] ABSTRACT

A resistor network is connected to a two wire line and used to detect and overcome changes of direct current levels without disturbing any alternating current signals superimposed thereon. Direct connections between the d.c. source and the network eliminate the effects of any fluctuations in the source voltage. The invention has general utility wherever changes in d.c. levels must be detected; however, a particular use of the invention is to compensate for longitudinal voltages induced on a telephone line.

14 Claims, 9 Drawing Figures

EBERHARD HERTER
INVENTOR

BY
Alter, Weiss & Whitesel
ATTYS

D.C. MONITOR CIRCUIT

The present application is a continuation of my copending application Ser. No. 555,913, filed June 7, 1966, which issued as U.S. Pat. No. 3,525,816 on Aug. 25, 1970.

This invention relates to voltage or current monitoring means and more particularly to means for monitoring a d.c. voltage on telecommunication lines and for compensating for unwanted fluctuations thereof.

Generally speaking, telephone lines must carry both direct and alternating currents. Usually, the direct current is supplied from a common battery, and it is used for many functions, such as: powering the transmitter, supervising loop conditions, holding equipment, and the like. If the direct current is not free of fluctuation, any of these and other functions might deteriorate or fill. The alternating current is the voice or other signal which is modulated upon the d.c. voltage. Obviously, therefore, the alternating current must be transmitted free and clear of all noise, distortion, interference, or the like.

Thus, certain problems are inherent in equipment which either controls or responds to these line currents. This equipment should detect and respond to any change in one kind of current (e.g. direct current) and not respond to any change in the other kind of current (e.g. alternating current). For example, a foreign voltage source, such as a nearby power line, might induce longitudinal currents on a telephone line which unbalance the flow of direct current from the battery. The battery current might flow, say, clockwise around the two wire loop, and the induced current flows in the same direction on both sides of the line. Thus, the battery and induced currents add on one wire or side and subtract on the other wire or side of the line. A detector should enable a compensating counter current to be fed to the line in opposition to the induced voltage, thereby restoring the original battery current. However, this restoration must not affect the a.c. signal; or, the intelligence of voice communications is lost.

Heretofore, there have been circuits for performing these and other functions. However, they have been subject to a number of problems. For one, the battery output has sometimes fluctuated and tripped (or failed to trip) the detector. Another problem is that the circuits have tended to be very expensive. Also, the voltage has sometimes become excessive and the sensitive detector equipment had to be protected from it. The phase relationship between all voltages on the line would not cause any unwarranted detection of foreign voltage sources. Still other problems will occur to those skilled in the art.

Accordingly, an object of the invention is to provide new and improved direct current loop voltage detectors. Here an object is to automatically feed a compensating voltage to a line in order to maintain stability despite fluctuations of line voltage. In this connection, an object is to prevent an influence from or upon alternating currents superimposed upon the direct current.

Another object is to provide a circuit for monitoring and compensating for changes in direct current on a line. Here an object is to correct all voltage changes which exceed a given threshold. Further an object is to accomplish these and other objects without disturbing the symmetry of the line.

Still another object of the invention is to accomplish these ad other objects at a minimum cost and with simple and reliable components. Conversely stated, an object is to avoid delicate, complex, or overly sophisticated components.

In keeping with an aspect of the invention, these and other objects are accomplished by a resistor network used to detect and overcome changes of direct current levels. This network is connected across the line without disturbing the symmetry of the currents on the line. Connections are made from the d.c. source normally feeding the line to the resistor network. These connections eliminate the effects of any variations in current from the source. A particular use of the invention is to supply a compensating voltage, which exactly matches and overcomes foreign voltages on a telephone line. However, the invention has general utility wherever changes in d.c. levels must be detected.

The above mentioned and other features and objects of this invention, and the manner of obtaining them will become more apparent and the invention itself will be best understood by reference to the following description of an embodiment of this invention taken in conjunction with the accompanying drawings, in which.

Figure 3:
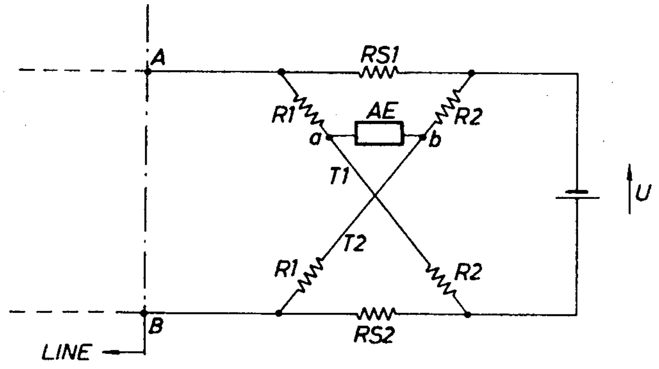
FIG. 3 is a schematic disclosure of a manner in which a voltage dividing network may be used to provide the functions of FIG. 2.
Figure 5:
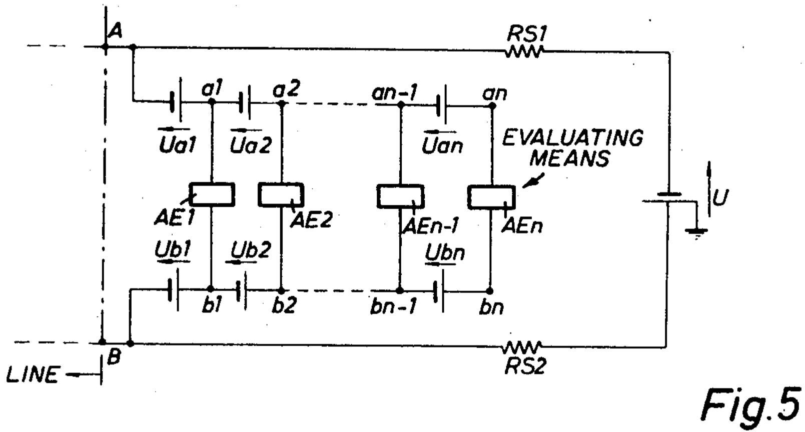
Figure 6:
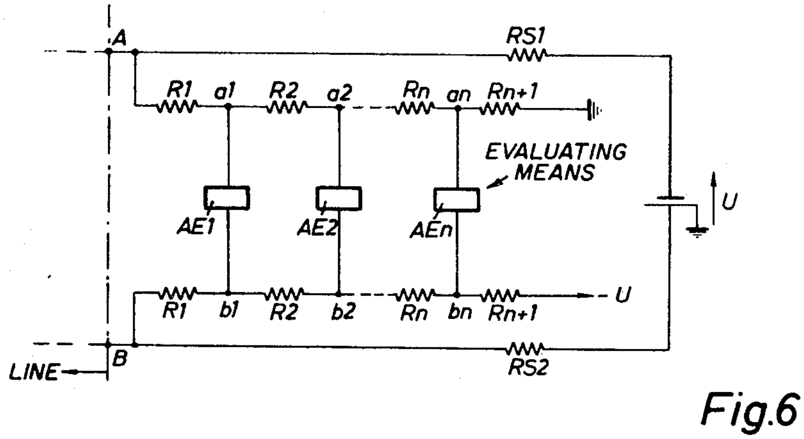
Figure 7:
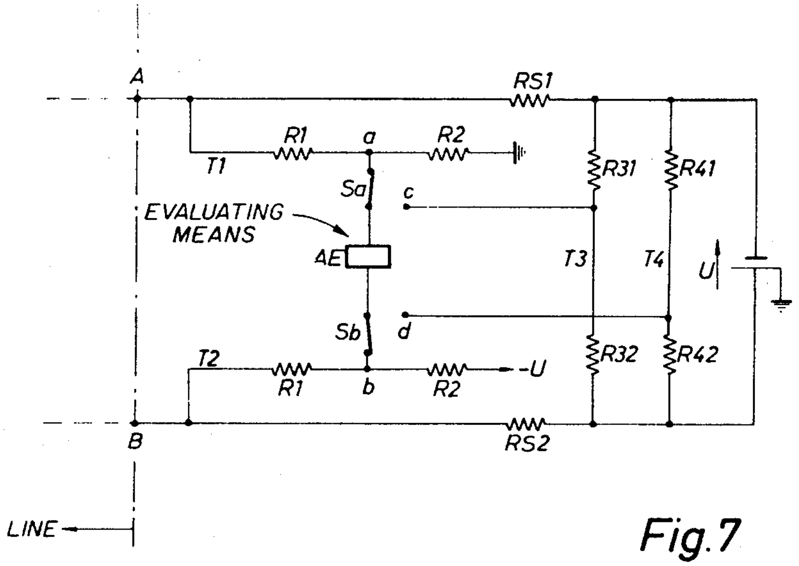
Figure 8:
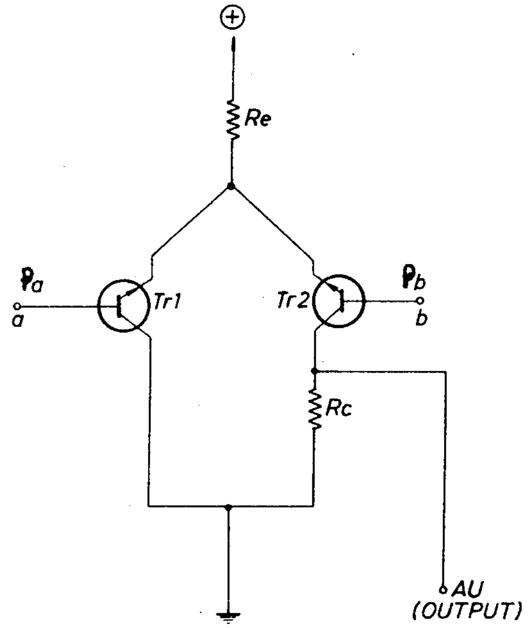
Figure 9:
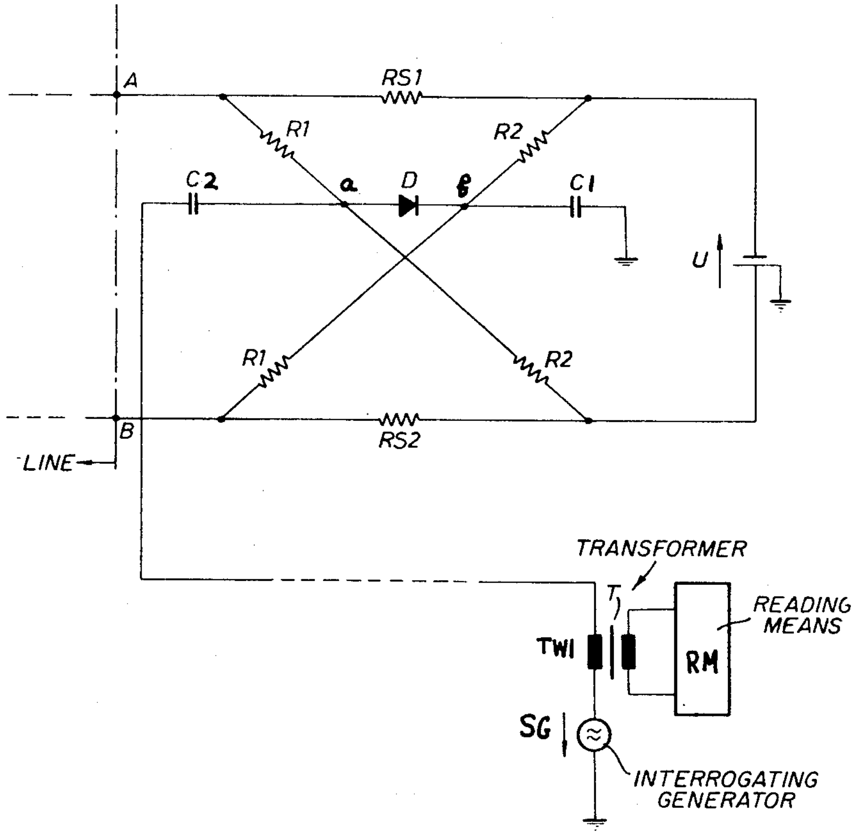

FIG. 5 schematically shows how a number of different voltages may be used to accomplish additional functions similar to the function of FIG. 3;

FIG. 6 is a schematic circuit diagram which shows how the functions of FIG. 5 may be carried out;

FIG. 7 is a schematic circuit diagram with a further refinement showing how controls may be added to provide a general purpose module having general utility;

FIG. 8 is a schematic circuit diagram showing a differential amplifier which may be used as a first embodiment of an evaluation device; and FIG. 9 is a schematic circuit diagram showing an alternative embodiment of the evaluation device of FIG. 8.

Figure 1:
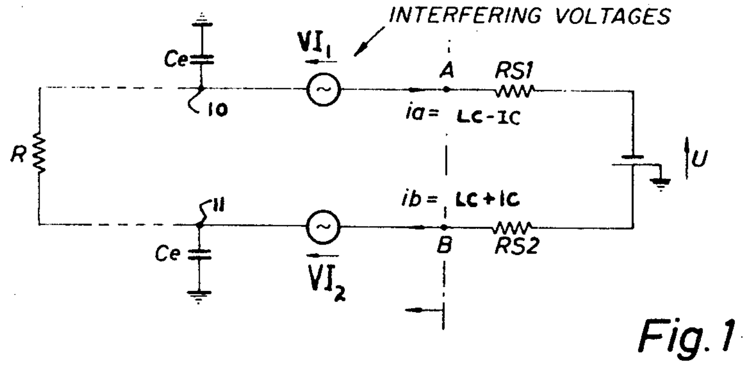
FIG. 1 is a schematic disclosure of desired and foreign voltages on a line loop which indicate the background of and need for the invention.

Briefly, FIG. 1 represents a well known problem, of a type which is especially likely to be encountered on telephone lines and elsewhere. If instruments are connected in either side of the line to measure current on the line, a direct current is observed to flow in a clockwise direction, as indicated by arrows near the letters A and B. This is obvious since the d.c. supply causes current to flow around the loop in a clockwise direction, using the convention of positive to negative current flow. If there is a near by foreign source of current (marked "Interfering Voltages"), it induces a voltage on the line, with current flow in the same direction on both sides of the line. Thus, these currents flow in the same direction at B (and add) on the lower one side and in opposite directions at A (and subtract) on the other or the upper side of the line.

In greater detail, FIG. 1 shows a line loop with two wires 10, 11. An exemplary telephone receiving station is shown by resistor R, and a central office battery is shown by the supply source U. The resistors RS1 and RS2 and the grounded capacitors Ce are lumped equivalents of the line.

If the load R on the left is a telephone set and the d.c. power source U on the right is the central office battery, the induced voltage could be hum from a nearby power line. Since the source of the induced voltage is usually some distance away from the two wires 10, 11 of the line, and the two wires are close together, the induced voltage is usually symmetrical on both sides of the line. If so, an instrument at B, on the lower side 11 of the line, shows a reading which is the sum of the battery current and the current resulting from the induced voltage. On the other side 10 of the line, an instrument at A shows a reading which is the difference of these two currents.

These currents are shown in the drawing by arrows VI which indicate that the interfering voltages are of the same polar sense and phase. Consequently, the interfering current IC, flowing across the grounded capacitance C*e*, increases the normal line current LC on wire 11 by the same amount that the interfering current IC simultaneously decreases the normal line current LC on the other wire 10. This combination of currents produces the resulting currents *ia, ib.*

Figure 2:
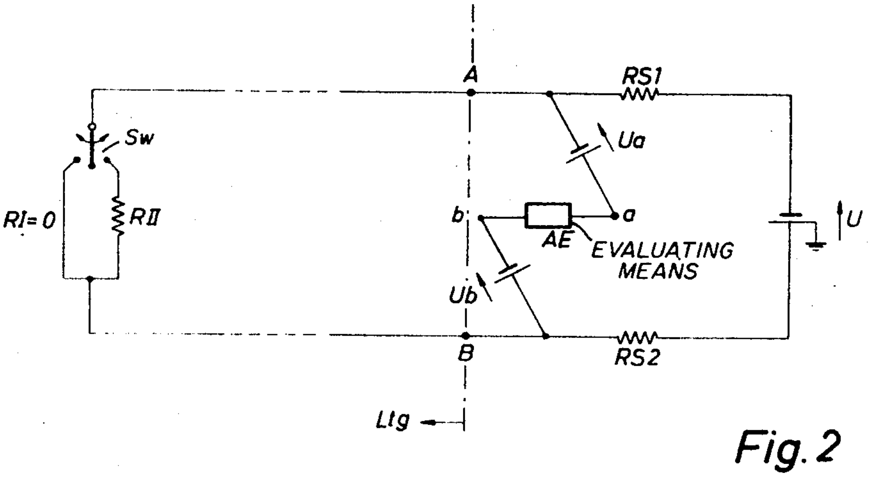
FIG. 2 is a schematic disclosure of a manner in which a compensating voltage may be added to a line.

FIG. 2 shows a sensor, detector, or evaluating circuit means AE. Two auxiliary voltage sources U*a* and U*b* are series-connected between the two terminals *a* and *b* of the sensor, detector, or evaluating device AE and the two line wires 10, 11. The series circuit U*a*, AE, and U*b* is connected in parallel to both the line loop and the d.c. source U. The resistors RS1 and RS2 are inserted in both lines between the supply source and the line loop terminals A, B. The switch SW symbolically represents a hook switch, and the resistors RI, RII indicate that the loop resistance may vary between a high value and a low value, responsive to hook switch operation.

Therefore, two second sources U*a* or U*b* (FIG. 2) of current may be added across the line. A compensating current is added on the upper side of the line to counteract the current subtraction resulting from the induced voltage. Likewise the second source U*b* draws current and subtracts a compensating current from the other side of the line to counteract the current addition resulting from the induced voltage. Accordingly, it is obvious that the summation of currents may exactly return the line current to that which is supplied by the d.c. source.

The solution of FIG. 2 described thus far is purely a hypothetical one. It is not easy to control the secondary sources U*a*, U*b* since the induced voltage is an unpredictable wild and random fluctuation. Therefore, some evaluation means AE must be supplied to detect the fluctuations and to vary the voltages U*a*, U*b* in response thereto. However, this theoretical solution to the problem does not always work in actual practice since the internal battery resistances and the evaluation device AE usually form unequal voltages thereby producing unsymmetrical results on the two sides of the line.

If the two sources U*a*, U*b*, connected on opposite sides of the evaluation device AE, are selected for exact balance, there is an expensive solution. However, even this expensive solution still depends upon the availability of a satisfactory evaluation device AE, two completely matched and stable sources U*a*, U*b* and a stable central office battery U. If the device AE has a slow response or if the battery U fluctuates, the problems are not solved by the solution in FIG. 2.

FIG. 3 shows how the inventive system overcomes these and other problems in a low cost and efficient manner. FIG. 3 shows an evaluating circuit in which the evaluating device AE is connected at the center points *a* and *b* of voltage dividers, resistors R1 and R2. These voltage dividers are connected via the resistors R2 directly to the supply source and via the resistors R1 to the line terminals A and B.

The principle d.c. source is a central office battery U which remains, as shown, on the right. The power supplies U*a*, U*b* (FIG. 2) are replaced by two voltage dividers each having resistors R1, R2. The voltage source is now the voltage difference resulting from the IR drop across these resistors. The evaluation device AE reacts to the voltage difference across the points *a*, *b*. Resistors R1, R2 set a threshold level of response, and they have a high resistance to protect the detector from high voltages. The same power supply U powers both the telephone line at A, B and the voltage dividers R1, R2. Thus, if there is any fluctuation in the battery output, such fluctuation appears both on the line and in the voltage dividers. Therefore, the compensation is fairly well immune to battery fluctuations. From another viewpoint, the compensation is also immune to the a.c. signal on the line.

From the arrangement of FIG. 3, there are three principal advantages:

1. The compensation circuit does not upset the complete symmetry of the line;
2. The IR drop introduces counter voltages so that the foreign voltages on the line are compensated;
3. The method is independent of fluctuations of the central office battery, since all power is from the same single source.

Moreover, as will become more apparent from a study of FIG. 7, there are now three points of possible control and voltage detection. The control points are at the places where the battery U is connected to the voltage dividers R1, R2. The detection is across the points *a*, *b* where the evaluating means AE is connected. Therefore, the invention has now provided a general purpose type of device which may find many uses.

For the circuit arrangements shown in FIGS. 2 and 3, it can be proved with the aid of Kirchhoff's Second Law that (1) the potentials Pa and Pb (at the points *a* and *b*) are influenced by the interfering voltages in the same way and (2) the effects of the interfering current cancel each other when forming the difference P*a* – P*b*. This cancellation effect is shown particularly in FIG. 4.

The threshold value Io of the loop current is shown in a current-voltage diagram (FIG. 4) which has been drawn for the circuit arrangement of FIG. 2, and the normalized representation of FIG. 3. The threshold value 1/R*o* corresponds to the current I*o* in the normalized representation. The value 1/U is an imaginary value in its definition.

Figure 4:
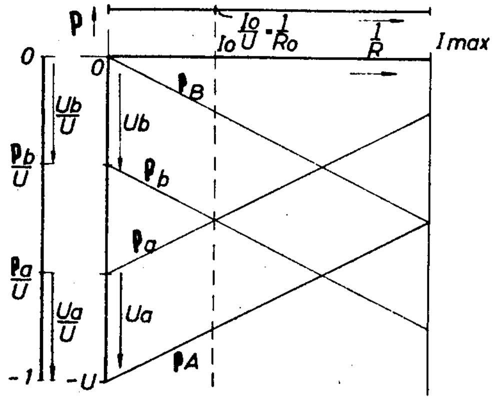
FIG. 4 is a graphical showing of current-voltage relationships which result from the circuits of FIGS. 2 and 3.

The loop resistance R*o* itself does not appear. The potential P*a* is smaller than the potential P*b* for the conditions where loop resistances are larger than the resistance R*o*, i.e. where line current is smaller than I*o*. The potential P*a* is larger than the potential P*b* where loop resistances are smaller than R*o*, i.e. where line current LC is higher than I*o*. For the indicated loop termination (FIG. 2) the line resistance RI = 0, and the loop current reaches a maximum, under ideal conditions where line current LC = (U/2 RS). In the circuit arrangement of FIG. 3, the potential curve is selected to use the scale 1/U, which is normalized to represent the voltage supplied through the resistors RS1, RS2. Thus, FIG. 4 shows that the circuit arrangement of FIG. 3 offers particular advantages in cases where the central office voltage fluctuates, since these fluctuations cancel each other in the divider circuits.

In FIGS. 5 and 6, the logic of the circuit arrangements of FIGS. 2 and 3 is extended to discriminate between more than two ranges of the loop current.

These two circuits are used if either different line terminals in a loop are to be evaluated, or a definite signal is to be evaluated in a number of loops with different resistances. For example, these different resistances might result from different loop lengths. Here, the loop length may be set by tappings ($a1, b1 \ldots a_n, b_n$) to which the evaluating device may be connected.

In greater detail, FIG. 5 shows that if a plurality of batteries U*a*1, U*b*1,...U*an and Ubn* are connected as the batteries U*a*, U*b* are connected in FIG. 2, each evaluation device AE1...AE*n* may be selectively operated responsive to a different threshold level of line current. FIG. 6 shows that each of the batteries may be replaced by selected tappings on a voltage divider. Again, it should be noted that the central office battery U also powers the voltage dividers. Therefore, any power supply variations are cancelled.

From the foregoing, it should be understood that the invention provides a general purpose module having utlity wherever it is necessary to separate d.c. and a.c. voltages or signals, free of influence from battery fluctuation. Thus far, the invention has been described under the assumption that the only problem is one of detecting and compensating for longitudinal voltages induced on a telephone line.

To show a more generalized situation, an exemplary monitor and control circuit is shown in FIG. 7. Here, there are two control points represented by the switches S*a*, S*b*, and one monitor point AE. The voltage dividers R1, R2 are essentially the same as corresponding voltage dividers in FIG. 3. Again the voltage dividers R1, R2, may be powered directly from the central office battery. Or, the voltage dividers may be powered from other voltage dividers R31, R32, R41, R42. Either way, all of the power comes from the same source so that everything is compensated during battery fluctuations.

In greater detail, if asymmetrical criteria are used in the line loop, or in operating the evaluating device, selections can be made to associate an individual wire through the switches S*a* and S*b*, as shown in FIG. 7. Thus, for example, if the switch S*a* is operated, the evaluation device is controlled responsive to voltage differencies between points *b* and *c*. To evaluate an asymmetrical signal appearing at the point *a*, the switch S*b* is connected with contact *d*. Therefore, the contacts *c* and *d* are the tapping points of voltage dividers T3 and T4, which may provide any desired reference potential. Instead of the two voltage dividers T3 and T4, one voltage divider may be provided with three resistors, having a corresponding divisional ratio.

Almost any device may be used as the evaluating circuit to sense or detect the voltage difference across the points *a* and *b*. By way of example, a difference amplifier is shown in FIG. 8 as including two transistors T*r*1, T*r*2 and a pair of biasing resistors. The emitter resistor R*e* is a common emitter bias source, and the resistor R*c* is a load for the transistor T*r*2.

In greater detail, FIG. 8 shows a differential amplifier which may be used an an evaluating device. Due to different loop resistances, different potentials P*a* and P*b* may appear at the bases of transistors T*r*1 and T*r*2. Therefore, these transistors T*r*1 or T*r*2 are switched to either the conductive or the non-conductive condition depending upon the voltages at the points *a*, *b*. The output AU is taken from the junction between the resistor R*c* and the collector of transistor T*r*2. Thus, the output voltage at AU depends upon the potential difference across the points *a* and *b* and the corresponding conditions of the respective transistors.

If transistor TR2 is turned off, the point AU is at ground potential, less any drop across the resistance RC. If transistor TR2 is turned on, the point AU is at battery potential, less any drop across the emitter resistor R*e*.

Since the common emitter resistor R*e* does not carry enough current to support conductively in both transistors, either transistor T*r*1 or T*r*2 is turned on. But both can not be turned on at the same time.

FIG. 9 shows a diode controlled circuit for evaluating the potential difference across the line. In greater detail, the detector comprises a series circuit traced from ground through capacitor C1, diode D, capacitor C2, transformer winding TW1 and signal generator SG to ground. If the voltage at point *a* is more positive than at point *b*, current flows from the signal generator SG to ground. This current is induced across transformer T to cause an output at the reading means, RM. However, if the point *b* is more positive than the point *a*, the diode D is back biased. No current flows through the winding TW1, no voltage is induced across the transformer T. The reading means RM does not give an output.

The arrangement of FIG. 9 introduces a number of possibilities for exercising logic control over a circuit. For example, a scanner may supply pulses for turning the generator SG on and off. Hence, the conditions of conductivity of the diode D are checked periodically. If current flows through diode D when a scanner pulses the interrogation generator SG, reading means RM indicates that wire A is more positive than wire B. If no current flows through diode D when the scanner pulses, the reading means RM indicates that the wire B is more positive than the wire A.

While the principles of the invention have been described above in connection with specific apparatus and applications, it is to be understood that this description is made only by way of example, and not as a limitation on the scope of the invention.

I claim:

1. A monitoring circuit for compensating for voltage changes appearing in a d.c. signal applied from a d.c. source to a two wire line without being influenced by a.c. signals superimposed on the d.c. voltage, said monitoring circuit comprising means for symmetically applying a compensating voltage across the conductors of said two wire line, and the source of said compensating voltage being a pair of voltage dividers, each voltage divider connected at one end to said d.c. source and at the other end to an individually associated one of said two wires, substantially equal resistances connected individually at one end to said d.c. source and at the other end to the other end of a voltage divider whereby said compensating voltage is applied from the d.c. source.

2. The monitoring circuit of claim 1 and means connected from the dividing point of one voltage divider to the dividing point of the other divider for detecting changes from normal voltage on said two wire line.

3. The circuit of claim 2, wherein said means connected from the dividing point of one divider to the dividing point of the other divider is a differential amplifier.

4. The circuit of claim 2, wherein said means connected from the dividing point of one divider to the dividing point of the other divider is a series circuit which extends from a potential point through a capacitor, the dividing point of one divider, a diode, the dividing point of the other divider and a second capacitor.

5. The circuit of claim 4 and means associated with said series circuit for detecting the current flowing when said diode is forwardly biased.

6. The circuit of claim 5 and scanner means for periodically operating said diode current flow detecting means.

7. The circuit of claim 1, wherein each of said voltage dividers has a plurality of tapping points and means selectively coupled across said voltage divider tapping points for giving a selected weight to the voltages on said two lines.

8. A voice immunity circuit for separating a.c. and d.c. voltages comprising a pair of voltage dividers, each divider being coupled on one of its ends to a d.c. source and at the other of its ends to an individually associated wire carrying said a.c. and d.c. voltages, means connected across the center points of said voltage dividers for detecting d.c. voltage changes on at least one of the wires associated with said pair of voltage dividers, substantially symmetrical resistances interposed between opposite terminals of said source and said wires, and means responsive to the detection of a change for selectively performing a control function.

9. The circuit of claim 8 and means for connecting the other ends of said pair of voltage dividers to opposite poles of the source of said d.c. voltages.

10. The circuit of claim 9 and means for selectively and periodically scanning said detecting means for ascertaining changes of said d.c. voltage.

11. The circuit of claim 10 wherein said detecting means comprises a diode connected across said center points and said scanning means comprises means for periodically applying a controlled voltage to said diode whereby said diode conducts unless it is back biased from said control points by said d.c. voltage on said line.

12. The circuit of claim 11 and reading means coupled to detect and indicate flow of current from said scanning means through said diode when said diode is forwardly biased.

13. The circuit of claim 8 and wherein said voltage dividers comprise means for symmetrically feeding voltages from a source of d.c. voltage to said two wires to compensate for d.c. voltage changes on said two wires.

14. In a telephone system, in combination, a communication loop having predetermined current conditions, a battery feed circuit comprising a battery conductor connected to one side of said loop including a first feed resistor and terminating in a source of potential and a ground conductor connected to the other side of said loop including a second feed resistor and terminating in ground, a pair of voltage divider circuits connected between said one side of said loop and ground and between said other side of said loop and said source, respectively, and a differential amplifier means having a pair of inputs connected to respective taps of said voltage divider circuits, currents between said source and ground in said first and second voltage divider circuits applying different bias voltages to said inputs to maintain said amplifier means non-conductive in the absence of current in said loop.

* * * * *